Figures 2, 3, 4:
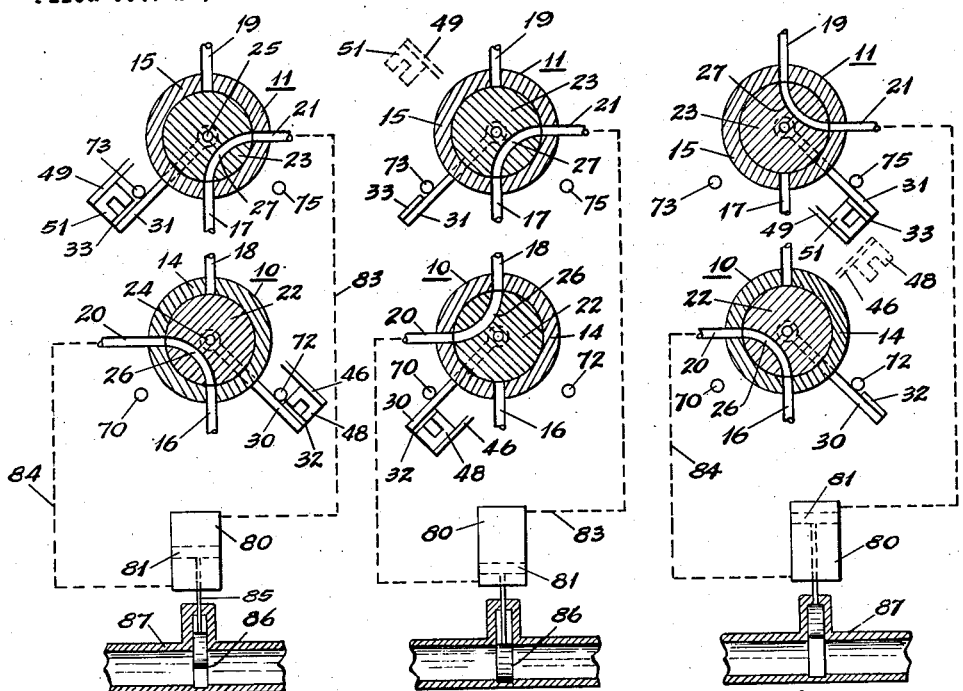

June 3, 1958  S. L. ADELSON  2,837,116
UNITARY MEANS FOR OPERATION OF TWO PILOT VALVES
Filed Oct. 29, 1956  2 Sheets-Sheet 1

June 3, 1958   S. L. ADELSON   2,837,116
UNITARY MEANS FOR OPERATION OF TWO PILOT VALVES
Filed Oct. 29, 1956   2 Sheets-Sheet 2

United States Patent Office 2,837,116
Patented June 3, 1958

2,837,116
UNITARY MEANS FOR OPERATION OF TWO PILOT VALVES

Samuel L. Adelson, Tucson, Ariz., assignor to Infilco Incorporated, Tucson, Ariz., a corporation of Delaware Application October 29, 1956, Serial No. 619,014

5 Claims. (Cl. 137—620)

This invention relates to means for manually operating in unison two three-way pilot valves that may be used for controlling the operation of pressure fluid cylinders connected with gate valves or other devices it is desired to control.

It is an object of this invention to provide a simple device of the type described that has a hold position wherein fluid pressures of equal magnitude are admitted simultaneously to both sides of the piston of a pressure fluid cylinder.

Another object of the invention is to provide means for manually operating two three-way pilot valves by a single knob or lever.

Another object of the invention is to use magnetic means for synchronizing the operation of two three-way pilot valves.

Other objects of the invention will become apparent from the specification and claims which follow.

One four-way pilot valve or two three-way pilot valves may be used to control the flow of fluid to fluid pressure cylinders. Air operated four-way valves presently available are bulky and costly. Three-way pilot valves for air operation are efficient, occupy a small space and are relatively inexpensive. However, use of two three-way pilot valves is difficult because the valves are not synchronized and each must be operated independently of the other by its own operating mechanism. It is virtually impossible to operate a fluid cylinder through two independent three-way valves, in a manner to stop the piston at a predetermined point intermediate its extreme positions during its reciprocation, because of the difficulty in synchronizing the three-way valves by manipulating two knobs simultaneously.

My invention synchronizes the operation of two three-way valves by combining them into a unitary structure operated by a single operating mechanism.

The invention will be more readily understood by reference to the drawings which form a part hereof and wherein like reference characters designate similar elements.

Figure 1:
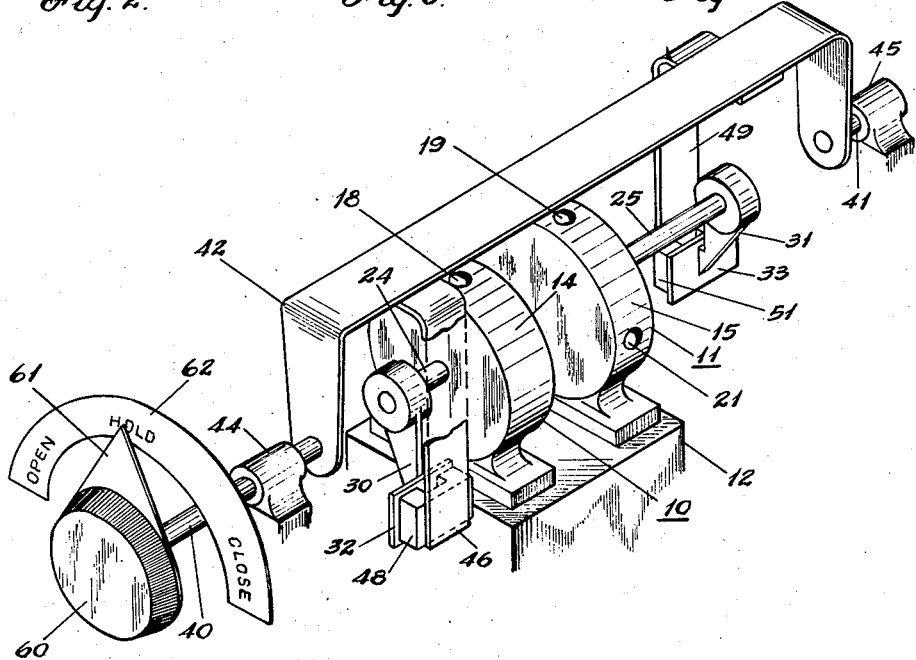
Figure 5:
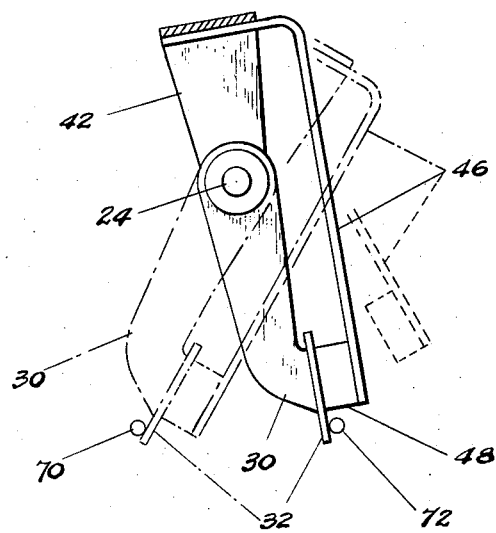
Figure 6:
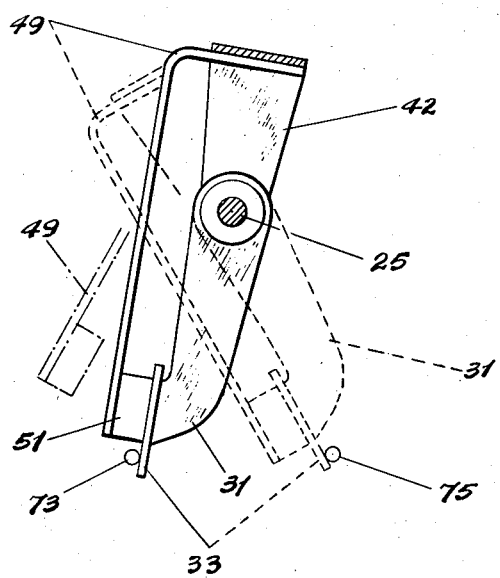

Figure 1 is a perspective view of a device according to the invention;

Figures 2, 3 and 4 are schematic vertical sectional views showing, respectively, the device of the invention in the positions it assumes when maintaining a reciprocable member, such as the sealing member of a gate valve, in an intermediate or "hold" position, a closed position and an open position; and Figures 5 and 6 are elevational views, partly in section, showing the valve operating elements in their three operating positions.

As shown in Figure 1, two three-way pilot valves 10 and 11 are mounted in back-to-back relationship on any suitable support, such as a base plate 12. The valves 10 and 11 have housings 14 and 15. As best shown in Figures 2, 3 and 4, the housings 14 and 15 are provided, respectively, with pressure ports 16 and 17 adapted for connection to a common source of fluid under pressure, waste ports 18 and 19, and service ports 20 and 21. Plugs 22 and 23, keyed to shafts 24 and 25, respectively, are freely rotatable within their housings 14 and 15.

As shown in Figures 2, 3 and 4, plugs 22 and 23 are provided with passageways 26 and 27, respectively, which, depending on the position of the respective plug, communicate the waste port or pressure port with the service port of the respective pilot valve. Rigidly connected to shafts 24 and 25, respectively, are crank arms 30 and 31 carrying on their free ends soft-iron armatures 32 and 33, respectively.

Coaxially aligned shafts 40 and 41 are rotatably mounted in bearings 44 and 45, respectively, and are fixed each with one end to a cross bar 42, as shown in Figure 1. Also affixed to cross bar 42 is an arm 46 which extends downwardly from cross bar 42 in front of shaft 24, as seen in Figure 1, and carries a permanent magnet 48 adjacent the armature 32. A second arm 49, also affixed to cross bar 42, extends downwardly therefrom in back of the shaft 25, as seen in Figure 1, and carries a permanent magnet 51 adjacent the armature 33.

A knob 60 with an indicator 61 is affixed to the free end of shaft 40. A dial 62 is mounted behind the indicator 61, as shown, and has reference points for valve open and valve closed positions and for a hold position intermediate the open and closed positions. It is obvious from Figure 1 that rotation of the knob 60 to one of its predetermined positions will swing the cross bar 42 and the arms 46 and 49 with their magnets 48 and 51 in the same direction. Clockwise movement of magnet 48 pushes armature 32 in a clockwise direction, and counterclockwise movement of magnet 48 pulls armature 32 in a counterclockwise direction by magnetic force. Also, clockwise movement of magnet 51 pulls armature 33 in a clockwise direction by magnetic force and counterclockwise movement of magnet 51 pushes armature 33 in a counterclockwise direction.

As shown in Figures 2, 3 and 4, stops 70 and 72 are disposed on opposite sides of, and suitably spaced from, pressure port 16 of pilot valve 10 and stops 73 and 75 are similarly disposed with respect to pressure port 17 of pilot valve 11. These stops lie, respectively, in the path of rotation of crank arms 30 and 31 with their armatures 32 and 33, and are so disposed that when rotation of the crank arms is arrested, shafts 24 and 25 and plugs 22 and 23, respectively, have been turned by crank arms 30 and 31, to a position where the passageways 26 and 27 connect service ports 20 and 21 with the pressure or waste port of the respective valve.

Service port 21 is connected to a fluid pressure cylinder 80 above its piston 81, as diagrammatically indicated by the broken lines 83, and service port 20 is connected to fluid cylinder 80 below its piston 81, as diagrammatically indicated by the broken line 84. Piston rod 85 of piston 81 is connected to the gate of a gate valve 86 installed in a conduit 87.

When the indicator 61 of the operating knob 60 is in the "hold" position as shown in Figure 1, then the valves 10 and 11 are in the positions shown in Figure 2 and in full lines in Figures 5 and 6. In this position the crank arm 30 of pilot valve 10 contacts stop 72 and plug 22 is in a position where passageway 26 connects pressure port 16 with service port 20, thereby admitting fluid pressure to cylinder 80 below its piston 81. Crank arm 31 of valve 11 contacts stop 73 and plug 23 is in a position where passageway 27 connects pressure port 17 with service port 21, thereby admitting fluid pressure to cylinder 80 above its piston 81. Since the pressure above piston 81 equals the pressure below the piston 81, the gate of valve 86 will be held in its then position until knob 60 is turned from the "hold" position.

Referring to Figure 3, this depicts the position of the valves 10 and 11 when knob 60 has been rotated in a clockwise direction from the "hold" position on dial 62 in Figure 1 to the "closed" position. Clockwise rotation of knob 60 causes magnet 48 to push armature 32 and crank arm 30 in a clockwise direction until further movement of crank arm 30 is arrested by stop 70, and plug 22 is in a position where passageway 26 connects service port 20 with waste port 18. Clockwise rotation of crank arm 31 of pilot valve 11 is prevented by stop 73; consequently, magnet 51 pulls away from armature 33 of crank arm 31 leaving plug 23 in the position where passageway 27 communicates service port 21 with pressure port 17, thereby maintaining the pressure above piston 81. Since there is no pressure applied below the piston 81, service port 20 being connected to waste, gate valve 86 is moved to its closed position. The position of armatures 32 and 33 and of magnets 48 and 51 relative to each other and to the stops 70 and 72, and 73 and 75, respectively, in the "closed" position of the valves is shown in dot and dash lines in Figures 5 and 6.

To fully open gate valve 86, as shown in Figure 4, the knob 60 is rotated in a counterclockwise direction to its "open" position whereby magnets 48 and 51 are also moved counterclockwise. When magnet 48 is swung counterclockwise, the attractive force of magnet 48 in contact with armature 32 pulls crank arm 30 along until stop 72 prevents its further movement. The magnet 48 on arm 46 then pulls away from the armature 32 to the position shown in Figure 4. The counterclockwise movement of armature 32 rotates plug 22 to a position where passageway 26 connects service port 20 to pressure port 16, whereby pressure fluid is admitted to cylinder 80 below the piston 81. When magnet 51 is swung counterclockwise it will contact armature 33 and move it to the position where stop 75 prevents further movement. In the corresponding position of plug 23 passageway 27 connects service port 21 to waste port 19. There is, therefore, no fluid pressure available above the piston 81 and gate valve 86 opens fully. The position of armatures 32 and 33 and of magnets 48 and 51 relative to each other and to the stops 70 and 72, and 73 and 75, respectively, in the "open" position of the valves is shown in dotted lines in Figures 5 and 6.

It will be seen that the invention provides a simplified control for fluid cylinders which is more economical than the devices of this general type in present day use.

It will be obvious that various modifications of the embodiment of the invention shown and described for purposes of illustration can be made without departing from the spirit and scope of the invention. For example, instead of connecting the device directly to the fluid cylinder 80, the synchronized three-way pilot valves may be used to control a fluid switch device which, in turn, controls the fluid cylinder 80. It should, therefore, be understood that I do not wish to limit myself to the exact structural details of the device shown herein for purposes of illustration, but not of limitation.

I claim:

1. In a pilot valve for controlling flow of pressure fluid to and waste fluid from a fluid cylinder of the type wherein a piston is operated by fluid under pressure, said pilot valve including two three-way valves, each having a housing, a pressure port, a waste port, and a service port in each housing, a rotary valve member rotatably mounted in each housing, a passageway in each rotary valve member adapted to selectively connect the pressure port or the waste port to the service port of the respective housing upon rotation of the valve member, said pressure ports being adapted to be connected to a source of fluid under pressure, and said service ports being adapted to be connected to said fluid cylinder on opposite sides of said piston, the combination with said valve members of unitary means for rotating said valve members, said means comprising a pair of armatures rigidly connected to said valve members, magnet means mounted to be in one position adjacent opposite faces of said armatures, means for swinging said magnet means from said one position through predetermined angles in clockwise direction and in counterclockwise direction, and stop means in the path of travel of said armatures.

2. A pilot valve for controlling flow of pressure fluid to and waste fluid from a fluid cylinder of the type wherein a piston is operated by fluid under pressure, said pilot valve including two housings, a pressure port, a waste port, and a service port in each housing, a plug rotatably mounted in each housing, a passageway in each plug adapted to selectively connect the pressure port and waste port to the service port of the respective housing upon rotation of said plug, and a rotatable shaft affixed to each plug; said pressure ports being adapted to be connected to a source of fluid under pressure, and said service ports being adapted to be connected to said fluid cylinder on opposite sides of said piston; characterized by an armature for each shaft and rigidly connected thereto, a magnet swingably mounted adjacent each armature on opposite faces thereof, means for swinging said magnets in unison to selectively revolve said armatures, and stop means in the path of travel of said armatures.

3. The device of claim 2, wherein said means for swinging said magnets comprises a swingable bar extending parallel to and coaxial with said shafts but spaced therefrom, said magnets being rigidly connected to said bar, and means for swinging said bar through predetermined angles.

4. In a pilot valve for controlling flow of pressure fluid to and waste fluid from a fluid cylinder of the type wherein a piston is operated by fluid under pressure, said pivot valve including two stationary housings, a pressure port, a waste port, and a service port in each housing, two rotatable shafts, a plug affixed to each of said shafts, said plugs being rotatable in said housings, and a passageway in each plug adapted, upon rotation of said plugs, to selectively connect the pressure port or the waste port to the service port of the respective housing; said pressure ports being adapted to be connected to a source of fluid under pressure, and said service ports being adapted to be connected to said fluid cylinder on opposite sides of said piston; the combination with said shafts of an armature rigidly connected with each shaft, a swingable bar coaxial with and parallel to said shafts, a first arm having one end affixed to said bar and its free end adjacent one side of one of said armatures, a magnet affixed to said free end, a second arm having one end affixed to said bar and its free end adjacent the other side of the other armature, a magnet affixed to the free end of said second arm, means for swinging said bar and said magnets to revolve said armatures and rotate said shafts, and stop means in the path of travel of said armatures.

5. A pilot valve for controlling flow of pressure fluid to and waste fluid from a fluid cylinder of the type wherein a piston is operated by fluid under pressure, said pilot valve including two housings, a pressure port, a waste port, and a service port in each housing, a plug rotatably mounted in each housing, a passageway in each plug adapted, upon rotation of the plug, to selectively connect the pressure port or the waste port to the service port of the respective housing, and a rotatable shaft affixed to each plug, said pressure ports being adapted to be connected to a source of fluid under pressure, and said service ports being adapted to be connected to said fluid cylinder on opposite sides of said piston; characterized by a crank arm affixed to the free end of each of said shafts, an armature affixed to the free end of each crank arm, a first magnet swingably mounted adjacent one of said armatures in such a manner that, when swung clockwise, it pushes said one armature and, when swung counterclockwise, it pulls said one armature by magnetic force, a second magnet swingably mounted adjacent the other of said armatures in such a manner that, when swung clockwise, it pulls said other armature by magnetic force, and when swung counterclockwise, it pushes said other armature, stop means in the path of travel of said armatures, and means for swinging said magnets in unison.

No references cited.

UNITED STATES PATENT OFFICE

CERTIFICATE OF CORRECTION

Patent No. 2,837,116                      June 3, 1958

Samuel L. Adelson

It is hereby certified that error appears in the printed specification of the above numbered patent requiring correction and that the said Letters Patent should read as corrected below.

Column 4, line 27, for "said pivot" read --said pilot--.

Signed and sealed this 7th day of October 1958.

(SEAL)

Attest:

KARL H. AXLINE

Attesting Officer

ROBERT C. WATSON

Commissioner of Patents